Dec. 17, 1968  R. B. RAVITTS  3,416,176
UNIT FOR REMOVING SOLIDS FROM TANKS, RESERVOIRS AND THE LIKE
Filed Aug. 9, 1967  4 Sheets-Sheet 1
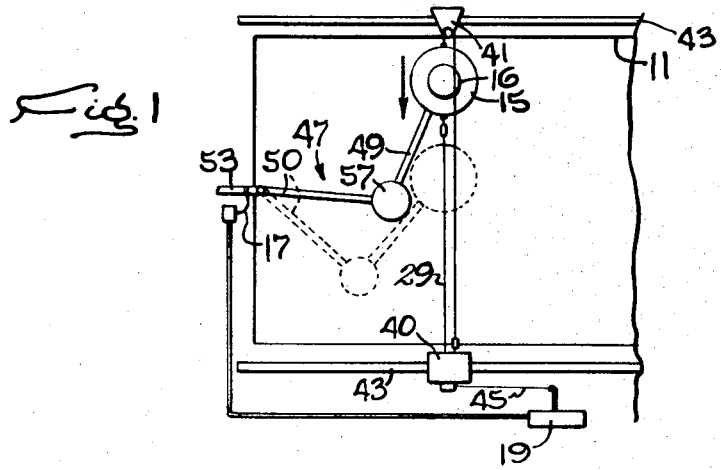
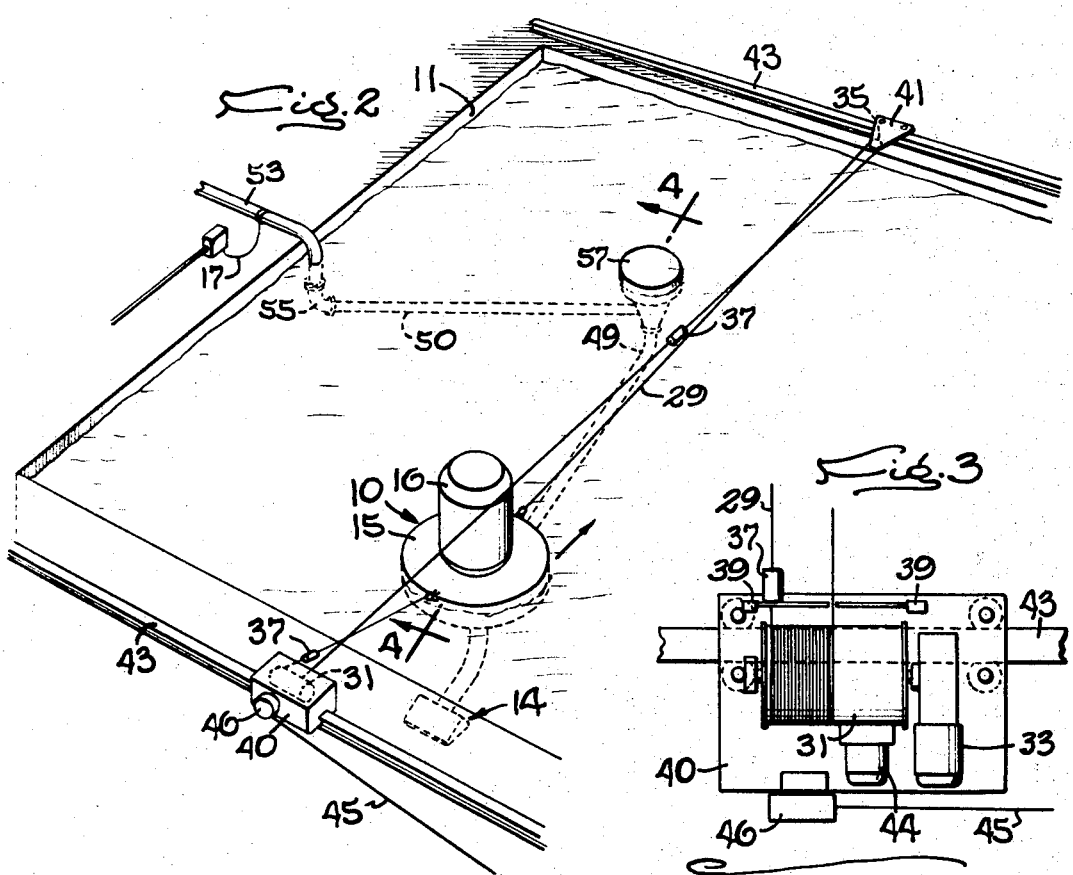
INVENTOR
Richard B. Ravitts
by Wolfe, Hubbard, Voit & Osann
ATTORNEY

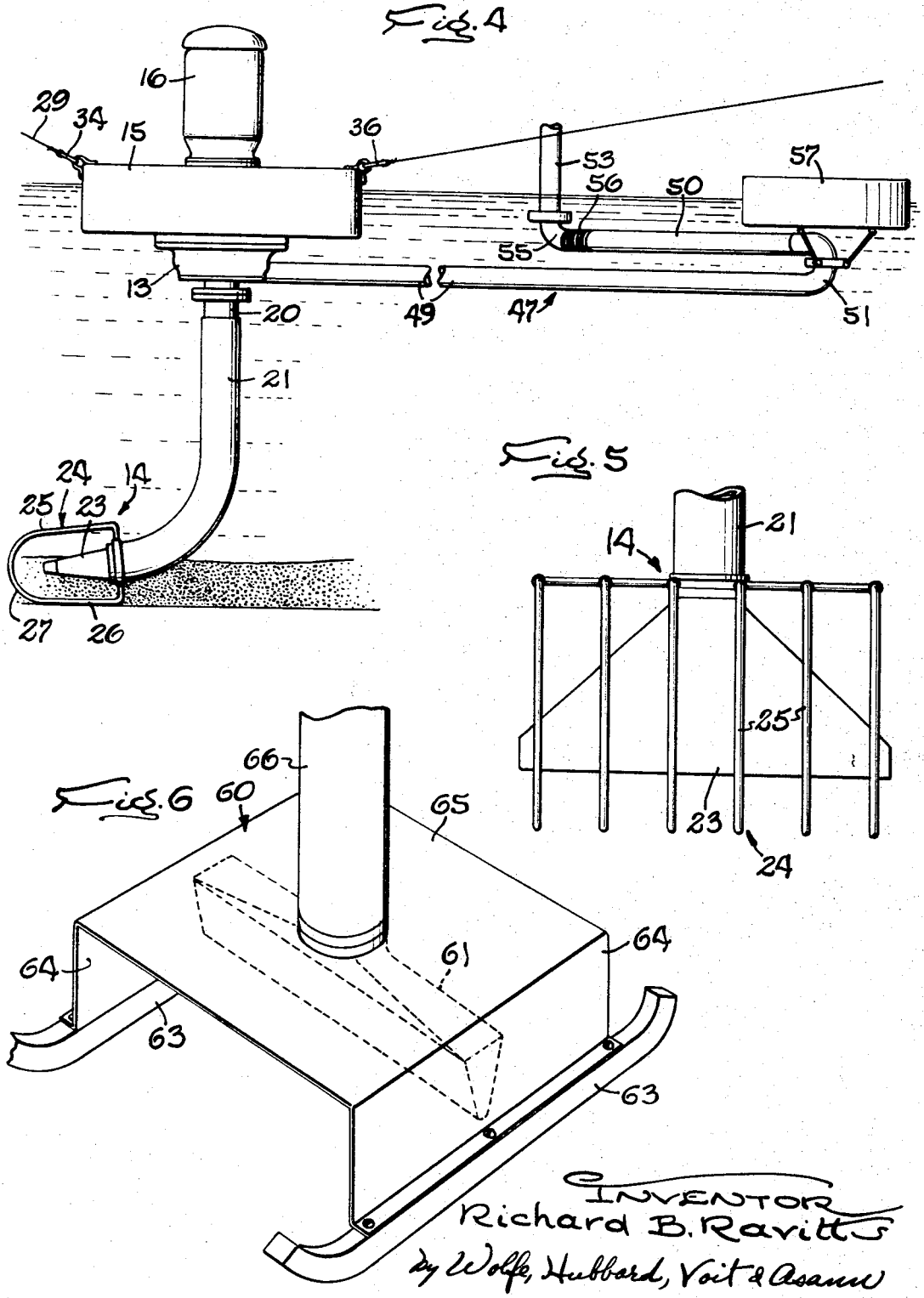

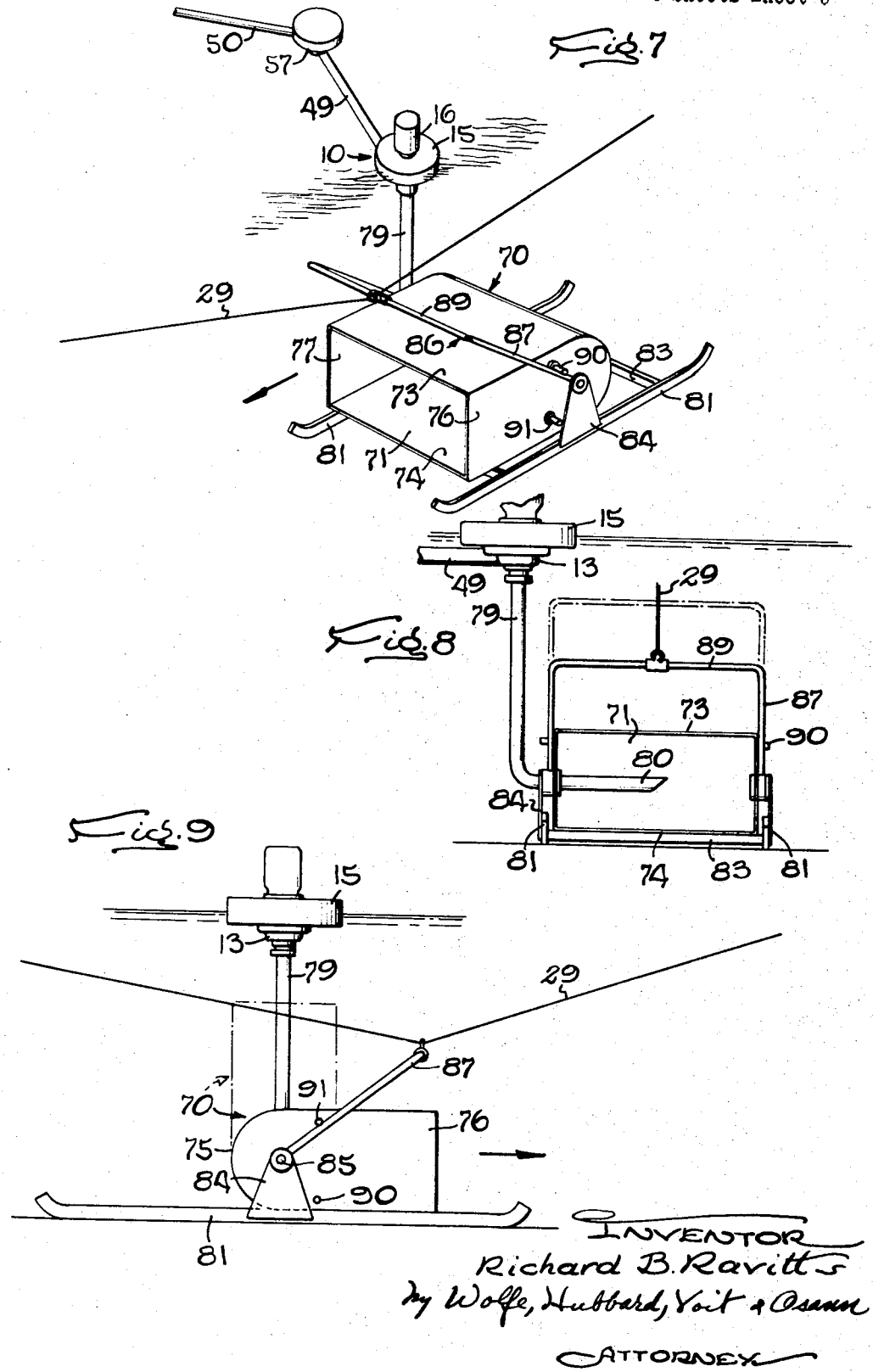

Dec. 17, 1968 R. B. RAVITTS 3,416,176
UNIT FOR REMOVING SOLIDS FROM TANKS, RESERVOIRS AND THE LIKE
Filed Aug. 9, 1967 4 Sheets-Sheet 4
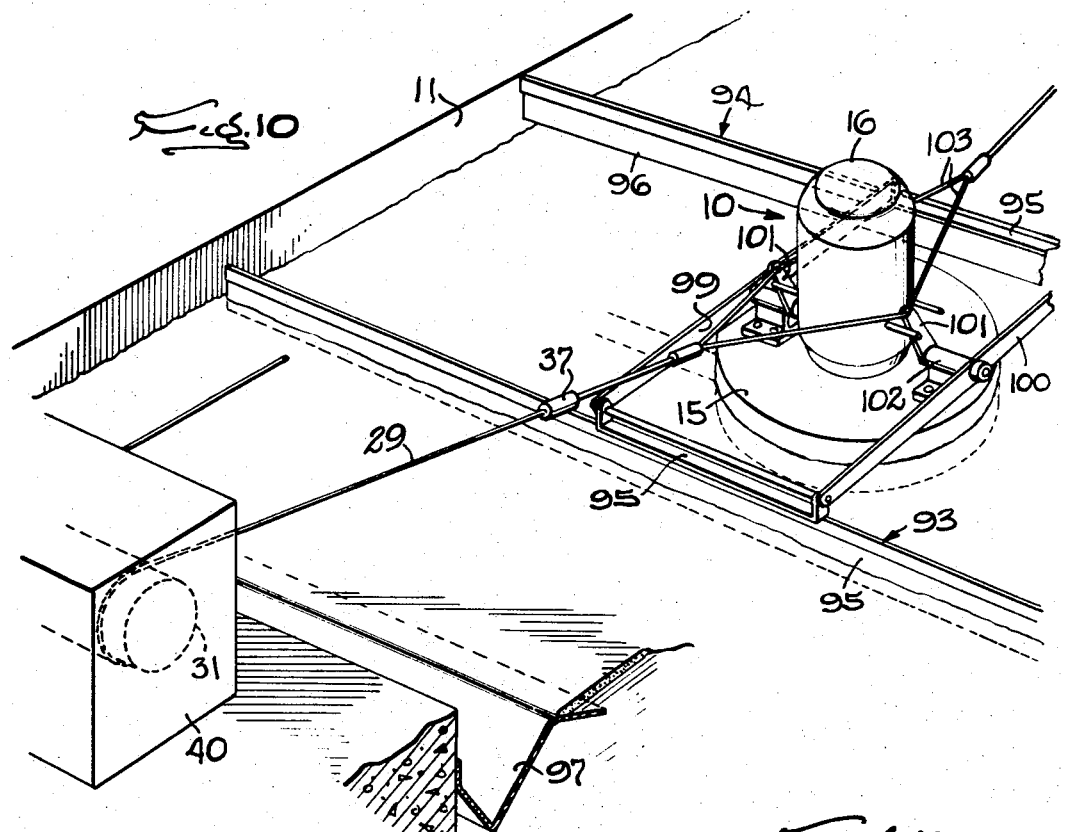
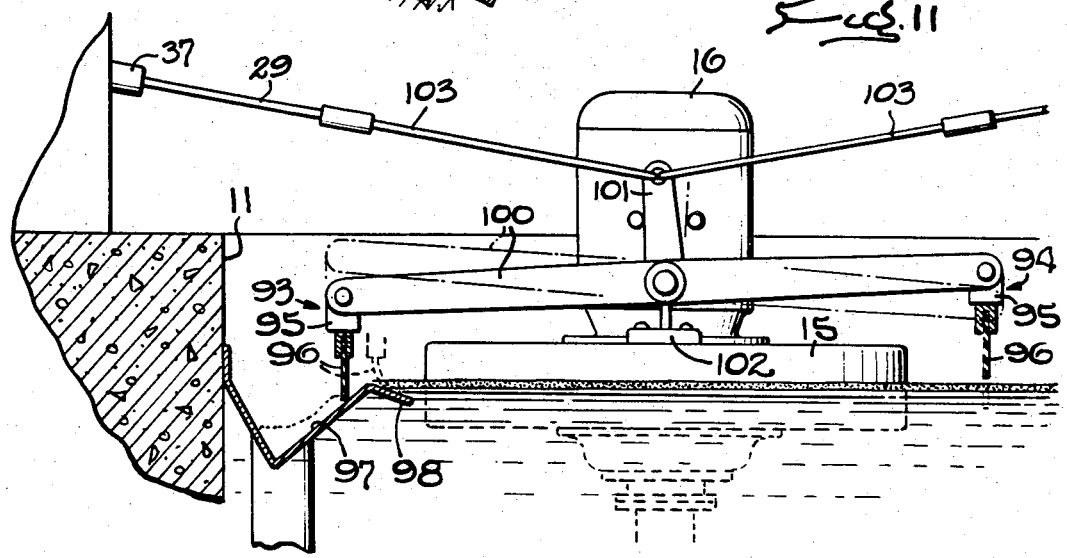
INVENTOR
Richard B. Ravitts
by Wolfe, Hubbard, Voit & Osann
ATTORNEY //
United States Patent Office 3,416,176
Patented Dec. 17, 1968

3,416,176
UNIT FOR REMOVING SOLIDS FROM TANKS, RESERVOIRS AND THE LIKE
Richard B. Ravitts, Rockford, Ill., assignor to Richards of Rockford, Inc., Rockford, Ill., a corporation of Illinois
Filed Aug. 9, 1967, Ser. No. 659,419
20 Claims. (Cl. 15—1.7)

ABSTRACT OF THE DISCLOSURE

A cleaning unit comprising a suction pump is supported within a tank of liquid by a buoyant float and communicates with an intake head disposed near the bottom of the tank. The pump and the float are movable automatically back and forth across the tank and also sidewise within the tank through a predetermined pattern with the head sweeping over substantially the entire area of the bottom of the tank and sucking up solid materials which accumulate on the bottom. To remove scum and other material on the surface of the water, two skimmers are disposed in leading and trailing relationship with the float and are alternately lowered into the water each time the float reverses directions.

Background of the invention

This invention relates to cleaning apparatus for removing solids from a reservoir such as, for example, a waste treatment tank in which solid material separates from liquid contained in the tank and settles by gravity to the bottom of the tank. The invention has more particular reference to apparatus of the type including a cleaning unit having a power-driven pump which sucks the solid material from the bottom of the tank and discharges the material at a point located beyond the tank.

Summary of the invention

The primary aim of the present invention is to provide a novel and simplified cleaning unit of the above character which automatically sweeps across the tank and sucks up the solids from substantially the entire area of the bottom of the tank. For this purpose, the invention contemplates a cleaning unit in which the pump is supported in the tank on a buoyant float an includes an intake head positioned near the bottom of the tank. In an automatic cycle, the unit is moved back and forth across the tank through a predetermined pattern with the intake head sweeping across and sucking up solids from the bottom of the tank during such movement. To accommodate variations in the depth of the liquid in the tank, the intake head is connected adjustably to the inlet of the pump in a novel manner so as to remain on the bottom of the tank even though the floating unit raises and lowers as the liquid level changes.

The invention also resides in the provision of novel skimmers disposed on opposite sides of the float and operable to glide across the surface of the liquid to remove scum and other solids which collect on the surface.

Brief description of the drawings

FIGURE 1 is a plan view of a waste treatment tank equipped with a cleaning unit embodying the novel features of the present invention.

FIG. 2 is an enlarged perspective view of the tank and cleaning unit shown in FIG. 1.

FIG. 3 is an enlarged plan view of parts shown in FIG. 2.

FIG. 4 is an enlarged fragmentary cross-section taken substantially along the line 4—4 of FIG. 2.

FIG. 5 is a fragmentary plan view of the intake head.

FIG. 6 is a fragmentary perspective view of a modified intake head.

FIG. 7 is a fragmentary perspective view of a cleaning unit equipped with still another type of intake head.

FIG. 8 is a fragmentary front elevation of the cleaning unit shown in FIG. 7.

FIG. 9 is a fragmentary side elevation of the cleaning unit illustrated in FIG. 7 and showing the intake head in a moved position.

FIG. 10 is a fragmentary perspective view of a cleaning unit equipped with scum skimmers.

FIG. 11 is a fragementary side elevation of the unit shown in FIG. 10.

Description of the preferred embodiment

As shown in the drawings for purposes of illustration, the invention is embodied in a cleaning unit 10 operable to remove solid material such as sludge from the bottom of a reservoir 11, the reservoir herein being illustrated as a treatment tank in which waste water or other liquid to be treated is collected for a period of time to allow the sludge to settle to the bottom of the tank. Usually, the bottom is lined with a layer of sand onto which the sludge accumulates. In time, the sludge builds up on the sand and thus the bottom of the tank must be cleaned periodically to remove the sludge.

The present invention contemplates a new and improved cleaning unit 10 operable to sweep across and remove the sludge from substantially every point in the bottom of the tank 11, such operation being achieved automatically and requiring little or no supervision from an attendant. To these ends, the cleaning or sweeping unit comprises a power-driven suction pump 13 (FIG. 4) which floats on the water and which is moved automatically across the surface of the water in a predetermined pattern. Connected to the suction side of the pump is an intake head 14 which moves through the pattern with the pump and ultimately sweeps across the entire area of the bottom of the tank to suck up substantially all of the accumulated sludge.

In the present instance, the pump 13 is mounted in the center of a buoyant float 15 which comprises a sealed outer shell filled with a low-density material such as polyurethane foam. A submersible electric motor 16 drivingly connected to the pump also is supported by the float and is disposed above the level of the water. Power for operating the motor is supplied through a waterproof cable 17 (FIGS. 1 and 2) connected between the motor and a power box 19 located near the tank 11.

As shown in FIG. 4, the pump 13 for the most part is disposed below the level of the water and includes an inlet 20 which is connected to the upper end of a relatively long suction tube 21 extending downwardly toward the bottom of the tank 11. The intake head 14 comprises a flared nozzle 23 connected at one end to the lower end of the tube and supported in a generally horizontal position on the bottom of the tank just above the level of the sand by a series of laterally spaced runners 24. In this instance, each runner is generally U-shaped in elevation and includes straight upper and lower portions 25 and 26 interconnected by an intermediate portion 27 which curves around the inlet or mouth of the nozzle. The runners serve the important function of keeping the nozzle spaced a predetermined distance above the sand so that the sand will not be sucked into the pump along with the sludge.

In the embodiment of the invention shown in FIGS. 1 to 5, the suction tube 21 is made of flexible material and is bowed intermediate its ends. Should the level of the water in the tank 11 rise or fall, thus changing the distance between the pump 13 and the bottom of the tank, the tube will become bowed to a lesser or greater extent to accommodate variations in the depth of the water without disturbing the horizontal disposition of the nozzle 23. Because the tube is flexible, the nozzle normally trails the inlet 20 of the pump as the sweeping unit 10 is moved back and forth across the tank, the mouth of the nozzle facing opposite to the direction of travel. Each time the unit reverses directions, the tube automatically flips the nozzle over to keep the mouth of the nozzle facing in the proper direction. While the nozzle is being flipped, the curved portions 27 of the runners 24 momentarily support the nozzle on the bottom of the tank to maintain the spacing between the mouth of the nozzle and the layer of sand.

To move the sweeping unit 10 back and forth across the tank 11, a cable 29 (FIG. 2) fastened to the float 15 is alternately pulled in opposite directions by a power-driven winch 31 mounted near one side of the tank. As shown most clearly in FIGS. 2 and 3, the winch herein is a drum which is adapted to be rotated in opposite directions by an actuator comprising a reversible motor 33. The flexible cable 29 is wound around the winch and is fastened at one end to the left end (FIGS. 2 and 4) of the float by a swivel connector 34. The other end of the cable is looped around a return sheave 35 located at the other side of the tank, and is fastened to the right end of the float by a swivel connector 36. With this arrangement, the cable winds in one direction on the winch when the motor 33 is driven in one direction and pulls the sweeping unit 10 from right to left. When the motor is reversed, the cable winds in the opposite direction and pulls the unit from left to right. To reverse the direction of travel of the unit automatically when it reaches the sides of the tank, a pair of stops 37 carried by the cable actuate at spaced intervals a pair of control switches 39 (FIG. 3) which act to reverse the direction of drive of the motor 33.

Preferably and as illustrated herein, the winch 31 and the return sheave 35 are carried by intermittently movable cars 40 and 41 which ride on tracks 43 disposed parallel to the sides of the tank 11 so that the unit 10 not only sweeps back and forth sidewise of the tank but also shifts between the ends of the tank between successive sidewise passes in order that the entire bottom area of a relatively large tank will be swept clean by the nozzle 23. The car 40 is considerably larger than the car 41 and also carries the winch motor 33 and the switches 39. Each car includes rollers (not shown) which ride within horizontally opening channels formed in the tracks. To shift the sweeping unit sidewise, the rollers of the car 40 are power driven by a reversible electric motor 44 (FIG. 3) carried by the car and connected to the power box 19 by a cable 45. The cable also serves to conduct current to the winch motor 33 and preferably is wound around an automatic take-up reel 46 mounted on the car 40. Through appropriate circuitry (not shown), the car motor 44 is energized for a short time each time one of the stops 37 actuates one of the switches 39. As a result, the sweeping unit is shifted toward one end of the tank through a short distance after it completes each sidewise pass of the tank. Thus, the nozzle will sweep through a different path across the bottom of the tank each time the unit reverses directions. It is preferable that the unit be shifted by the car 40 through a distance slightly less than the width of the nozzle so that the latter will sweep through overlapping paths to insure thorough cleaning of each section of the bottom of the tank. If continuous cleaning of the tank is desired, reversing dogs (not shown) may be mounted near each end of the track to reverse the direction of operation of the motor 44, and thus the direction of the sweeping unit, when the car 40 approaches the ends of the tank.

The sludge sucked into the pump 13 through the intake nozzle 23 is carried away from the tank 11 by a discharge pipe 47 communicating with the outlet of the pump and extending to a discharge area located beyond one end of the tank. To accommodate movement of the pump to various points within the tank and yet still conduct the sludge away from the tank, the discharge pipe is articulated intermediate its ends and is adapted to fold toward and extend away from the ends of the tank as the pump moves back and forth within the tank. For this purpose, the discharge pipe comprises a first section 49 connected at one end to the outlet of the pump and pivotally connected at its opposite end to one end of a second pipe section 50 by a swivel joint 51 (FIG. 4) which permits the two sectioons to swing relative to each other about a vertical axis. The other end of the second pipe 50, in turn, is connected to a stationary pipe 53 (FIG. 2) which leads to the discharge area. An elbow 55 is swiveled on the lower end of the pipe 53 to turn about a vertical axis and is connected to the pipe 50 by a short segment 56 of flexible conduit to allow the pipes 49 and 50 to move back and forth in the tank with the sweeping unit and also to accommodate vertical movement of the pipes as the water level changes. Preferably, a second buoyant float 57 is moored to the joint 51 between the pipes 49 and 50 to help support the pipes and the sweeping unit in the water. In addition, the electric cable 17 leading from the power box 19 is advantageously strung along the pipe sections to the pump motor 16.

With the discharge pipe 47 constructed as described above, the two pipes 49 and 50 define a V which folds and becomes narrower as the sweeping unit 10 approaches the pipe 53 and then extends as the unit moves toward the other end of the tank. To enable cleaning of the entire tank without the discharge pipe striking against the sides of the tank and interfering with movement of the sweeping unit, the stops 37 may be set to reverse the winch motor 33 at relatively short intervals so that the unit will be moved back and forth across only one-half of the tank. While the unit is cleaning the first half of the tank, the discharge pipe may be positioned as shown in FIG. 1 with the float 57 or the apex of the V disposed in the other half of the tank. With the discharge pipe thus positioned, the unit may move into any point within the first half of the tank without the pipe restricting the motion of the unit or engaging the sides of the tank. After the first half of the tank has been cleaned, the discharge pipe may be pivoted about the swivel joints 51 and 54 to fold the V in the opposite direction and to position the float 57 in the first half of the tank as shown in FIG. 2. The stops 37 then may be repositioned along the cable 29 to cause the winch motor 33 to move the sweeping unit through the second half of the tank. This changeover is relatively simple and is the only manual operation necessary to achieve complete cleaning of the entire bottom area of the tank.

A modified head 60 adapted for use in conjunction with the sweeping unit 10 is shown in FIG. 6. In this instance, a nozzle 61 is disposed in a generally upright position and opens downwardly toward the bottom of the tank 11. The nozzle is supported with the inlet end disposed above the bottom of the tank by a pair of runners in the form of elongated skids 63 fastened to the lower ends of flanges 64 turned downwardly from a horizontal plate 65 fastened to and extending across the upper side of the nozzle. A suction tube 66 communicates at its upper end with the inlet of the pump and is connected at its lower end to the nozzle. To accommodate changes in the water depth, the tube may be formed of flexible material as before or, if more rigidity is desired, the tube may consist of two or more metal sections telescoped slidably with each other and adapted to extend and collapse as the pump raises and lowers relative to the bottom of the tank.

Still another intake head 70 is shown in FIGS. 7 to 9 and is constructed to loosen the sludge from the bottom of the tank 11 as well as to suck up the sludge as the unit 10 sweeps back and forth across the tank. To these ends, the intake head is in the form of a relatively large scoop which is generally U-shaped in elevation and which is formed with an open mouth 71 facing the direction of travel. The scoop 70 includes straight upper and lower walls 73 and 74 interconnected by a curved end wall 75 disposed at the trailing end of the scoop. The leading edge of the lowermost wall tends to cut through the sludge and deliver the sludge into the scoop as the unit sweeps across the tank. A pair of plates 76 and 77 fastened to the side edges of the upper and lower walls enclose the sides of the scoop to confine the sludge therein.

After the sludge has been loosened from the bottom of the tank 11 and directed into the scoop 70, it is sucked into the pump 13 through a suction tube 79. As shown in FIG. 8, the suction tube is connected at its upper end to the inlet 20 of the pump and extends downwardly along one side of the scoop. The lower end of the tube is formed with a horizontal nozzle section 80 which extends through the side plate 77 and which terminates in an open end disposed midway between the two side plates 76 and 77. With this arrangement, the sludge directed into the scoop is sucked into the nozzle 80 and is delivered through the tube 79 to the pump 13 for discharge. The tube 79 preferably is formed by two sections slidably telescoped together to enable movement of the pump relative to the scoop as the water level changes.

To maintain the scoop 70 spaced above the bottom of the tank 11 and to facilitate movement of the scoop along the bottom, a pair of laterally spaced runners or skids 81 interconnected by cross bars 83 extend beneath the scoop and hold the lowermost leading edge of the scoop just above the level of the sand. The skids are attached to the scoop by a pair of mounting plates 84 upstanding from the skids, one of the mounting plates being connected pivotally to the side plate 76 by a horizontal pin 85 extending through the two plates. The nozzle section 80 of the suction tube 79 projects through the other mounting plate and the side plate 77 and pivotally mounts the other side of the scoop on the skids. Thus, the scoop is connected pivotally to the skids and may turn relative thereto.

The above-described mounting of the scoop 70 is used to advantage to turn the scoop over automatically with a positive motion each time the sweeping unit 10 reverses directions and thereby keep the mouth 71 of the scoop facing in the direction of travel. For this purpose, a yoke-like towing member 86 is formed with laterally spaced legs 87 which are journaled at their lower ends on the nozzle section 80 and the pin 85 by bearings (not shown). Spanning the two legs is a bight portion 89 to which the ends of the cable 29 are connected so that, in this instance, the winch 31 pulls the scoop directly rather than pulling the float and the pump as in the previous embodiments. Each time the sweeping unit reverses directions, the scoop stops momentarily on the bottom of the tank during initial movement of the yoke 86 in the opposite direction. During such initial movement of the yoke, the two legs 87 swing relative to the scoop and move into engagement with a pair of stops 90 projecting outwardly in opposite directions from the side plates 76 and 77 near the upper wall 73 of the scoop. As a result of such engagement, the scoop is swung upwardly about the pivot axis defined by the pin 85 and the nozzle section 80 and is turned relative to the skids 81 to the position shown in phantom in FIG. 9. Thereafter, the center of gravity of the scoop passes forwardly over the pivot axis and the scoop falls downwardly by its own weight to resume a horizontal position with the mouth facing the new direction of travel. An additional pair of stops 91 projecting from the side plates near the wall 74 are engageable with the legs of the yoke to turn the scoop over when the unit once again reverses directions. With this arrangement, the skids 81 always remain in a horizontal position to provide a stable support for the scoop and yet the latter is turned with a positive action to keep the mouth facing the direction of travel.

In accordance with another aspect of the invention, scum and other foreign materials which collect on the surface of the water are removed as the unit 10 sweeps back and forth by means of a pair of skimmers 93 and 94 (FIGS. 10 and 11) disposed on opposite sides of the float and operable to glide across the surface of the water to clean the scum from the surface. Moreover, the skimmers are mounted for movement into and out of the water in response to each reversal in the direction of travel of the unit so that the leading skimmer is always disposed in the water and the trailing skimmer is always disposed out of the water to insure more efficient cleaning.

As shown most clearly in FIGS. 10 and 11, each skimmer 93 and 94 comprises an elongated bar 95 extending transversely of the back and forth path of movement of the unit 10 and disposed near the surface of the water. Preferably, a rubber wiper 96 is fastened to the lower side of each bar and is adapted to ride through the water with its free edge submerged just below the surface thereby to skim off any scum on the surface and to push the scum through the water ahead of the float 15. A trough 97 is mounted near each side of the tank 11 to receive the scum from the wiper and is formed with a downwardly inclined lip 98 to allow the wiper to ride into the trough and deposit the scum.

The two skimmers 93 and 94 are connected pivotally to the ends of a pair of transversely spaced links 99 and 100 which, in turn, are fastened intermediate their ends to cranks 101 journaled to oscillate back and forth in bearings 102 fastened to the upper side of the float 15. Movement of alternate ones of the skimmers into the water in accordance with the direction of travel of the unit is effected in this instance by a cable-type yoke 103 fastened between the ends of the tow cable 29 and secured to the operating arms of the cranks. As the unit sweeps from right to left (FIG. 11), the cable and the yoke exert a force on the cranks turning the latter and the links 100 counterclockwise so that the skimmer 93 is lowered into the water and the skimmer 94 is raised upwardly out of the water. When the unit approaches the trough 97 and reverses directions, the cable and the yoke move reversely to swing the cranks and the links in the opposite directions thereby to raise the skimmer 93 out of the water and to lower the skimmer 94 into the water. Thus, the leading skimmer is always disposed in the water to insure that the scum will be pushed ahead of the float, and the trailing skimmer is always lifted out of the water to reduce the possibility of scum building up between the two skimmers in the area of the float.

From the foregoing, it will be apparent that the new and improved sweeping unit 10 of the present invention is operable to clean the entire bottom area of the tank and to skim scum from the surface with very little attention on the part of an operator or attendant. The unit may be used with equal effectiveness in various bodies of water such as lagoons, basins, and ponds in which sludge or other solid material collects and must be removed at periodic intervals.

I claim as my invention:

1. In apparatus for removing solids from a reservoir of liquid, the combination of, a sweeping unit comprising a power-driven suction pump having an inlet and an outlet, a buoyant float supporting said pump in the liquid with said inlet disposed above the bottom of the reservoir, a suction tube communicating at its upper end with said inlet, an intake head connected to the lower end of said tube and supported on the bottom of the reservoir, and power mechanism supported independently of said float and operably connected to said unit for moving the pump and the float back and forth in a predetermined path across the reservoir whereby the intake head sweeps across and sucks up solids from different areas of the bottom of the reservoir.

2. Apparatus as defined in claim 1 in which the lower end of said suction tube is movable toward and away from the upper end of said tube whereby the vertical distance between the upper and lower ends automatically changes in response to variances in the depth of the liquid.

3. Apparatus as defined in claim 1 further including an elongated runner supporting said intake head on the bottom of the reservoir and maintaining the head spaced a predetermined distance above the bottom.

4. Apparatus as defined in claim 3 in which said intake head is disposed substantially horizontally and trails the upper end of said tube as said sweeping unit is moved across the reservoir, said runner being substantially U-shaped and having upper and lower portions respectively disposed above and below said head and interconnected by an intermediate portion curving around the trailing end of the head.

5. Apparatus as defined in claim 3 in which said intake head is pivotally connected to said runner to turn about a horizontal axis, said intake head having an inlet opening for admitting solids into the head, and means responsive to each reversal in the direction of movement of said unit for turning said head about said axis and relative to said runner to change the direction in which said inlet opening faces.

6. Apparatus as defined in claim 5 in which said means comprise a towing cable connected to said head.

7. Apparatus as defined in claim 3 in which said intake head comprises a substantially U-shaped scoop having one end pivotally connected to said runner to turn about a substantially horizontal axis, the other end of said scoop being open and constituting an intake mouth, a towing member pivotally connected at one end to turn about said axis, and upper and lower abutment surfaces on said scoop and alternately engageable with said towing member when said sweeping unit reverses directions whereby said towing member turns said scoop about said axis to reverse the direction in which said intake mouth faces.

8. Apparatus as defined in claim 7 in which said towing member comprises a yoke having a pair of legs pivotally connected at their lower ends to opposite sides of said scoop to turn about said axis, said suction tube extending into said scoop along said axis and to a point approximately midway between the sides thereof.

9. Apparatus as defined in claim 1 further including a discharge pipe connected to the outlet of said pump and discharging beyond the reservoir, said pipe being articulated intermediate its ends to enable movement of said unit to various positions within said reservoir.

10. Apparatus as defined in claim 9 in which said discharge pipe includes a first section having an inlet end connected to said pump outlet, a third section having an outlet end discharging beyond the reservoir, and an intermediate section pivotally connected at one end to the outlet end of said first section and pivotally connected at its other end to the inlet end of said third section.

11. Apparatus as defined in claim 9 further including a second buoyant float connected to said discharge pipe intermediate the ends thereof and maintaining said pipe at a predetermined level in the liquid.

12. Apparatus as defined in claim 1 in which said power mechanism includes a cable extending from said unit to beyond the edges of the reservoir, and rotatable winch means connected to said cable and operable to wind and unwind the cable thereby to move said unit back and forth across the reservoir in said path.

13. Apparatus as defined in claim 12 in which said mechanism further includes carriage means mounting said winch means and movable along a predetermined path substantially normal to said one path.

14. Apparatus as defined in claim 13 and further including a first power actuator for rotating said winch means and a second power actuator for moving said carriage means, and mechanism for operating said actuators at spaced intervals and in timed relation thereby to cause said unit to sweep across said reservoir in a multi-directional path.

15. Apparatus as defined in claim 1 further including a pair of elongated skimmers disposed on opposite sides of said float and extending transversely of said path, means mounting each skimmer for movement between a raised position disposed above the surface of the liquid and a lowered position disposed in contact with the surface of the liquid, and mechanism responsive to each reversal in the direction of travel of said unit for moving one of said skimmers to said raised position and for moving the other of said skimmers to said lowered position.

16. Apparatus as defined in claim 15 in which said skimmers are mounted to turn between said raised and lowered positions, and including an operating linkage interconnecting said skimmers and operable when actuated to turn both of said skimmers simultaneously.

17. In apparatus for removing solids from a reservoir of liquid, the combination of, a sweeping unit comprising a power-driven suction pump having an inlet and outlet, a buoyant float supporting said pump in the liquid with said inlet disposed above the bottom of the reservoir, a suction tube communicating at its upper end with said inlet, an intake head connected to the lower end of said tube and supported on the bottom of the reservoir, power mechanism operably connected to said unit for moving the latter back and forth in a predetermined path across the reservoir whereby the intake head sweeps across and sucks up solids from different areas of the bottom of the reservoir, and a pair of elongated skimmers extending transversely of the path and disposed near the surface of the liquid, one of said skimmers being positioned on one side of said float and being operable to remove solids from the surface of the liquid when the unit is traveling in one direction, and the other of said skimmers being disposed on the opposite side of said float and being operable to remove solids from the surface of the liquid when the unit is traveling in the opposite direction.

18. Apparatus as defined in claim 17 in which said skimmers are mounted for movement between raised positions disposed above the surface of the liquid and lowered positions disposed in contact with the surface of the liquid, and mechanism responsive to each reversal in the direction of travel of said unit for moving one of said skimmers to said raised position and for moving the other of said skimmers to said lowered position.

19. In apparatus for removing solids from the bottom of a reservoir of liquid, the combintion of, a sweeping unit comprising a pump having an inlet and an outlet, an electric motor for driving said pump and adapted for connection to a power source beyond the reservoir, buoyant float supporting said pump and said motor in the liquid with the inlet of said pump disposed above the bottom of the reservoir, a suction tube connected at its upper end to said inlet, an intake head connected to the lower end of said tube and supported on the bottom of the reservoir, said tube being capable of moving relative to said pump and said head as the liquid level drops and as the upper end of the tube moves toward the bottom of the reservoir, and power mechanism connected to said unit for moving the unit in a predetermined pattern across said reservoir, said mechanism being operable to move said unit first in one direction, then in a second direction normal to said one direction and then in a third direction opposite to said one direction whereby the intake head sweeps through a multi-directional path and picks up solids from different areas of the bottom of the reservoir.

20. Apparatus as defined in claim 19 in which said intake head is of predetermined width and in which said mechanism moves said unit in said second direction through a distance less than the width of the head whereby said head, when moving in said opposite direction, travels in a path which overlaps the path traveled by said head in moving in said one direction.

References Cited

UNITED STATES PATENTS

| | | | |
|---|---|---|---|
| 2,646,889 | 7/1953 | Dulak | 15—1.7 |
| 3,254,355 | 6/1966 | Shaw | 15—1.7 |

EDWARD L. ROBERTS, *Primary Examiner.*